No Printed Specification Available
9227X
F. FOSSARD.
Dyeing Vat.
Patented Nov. 7, 1835.
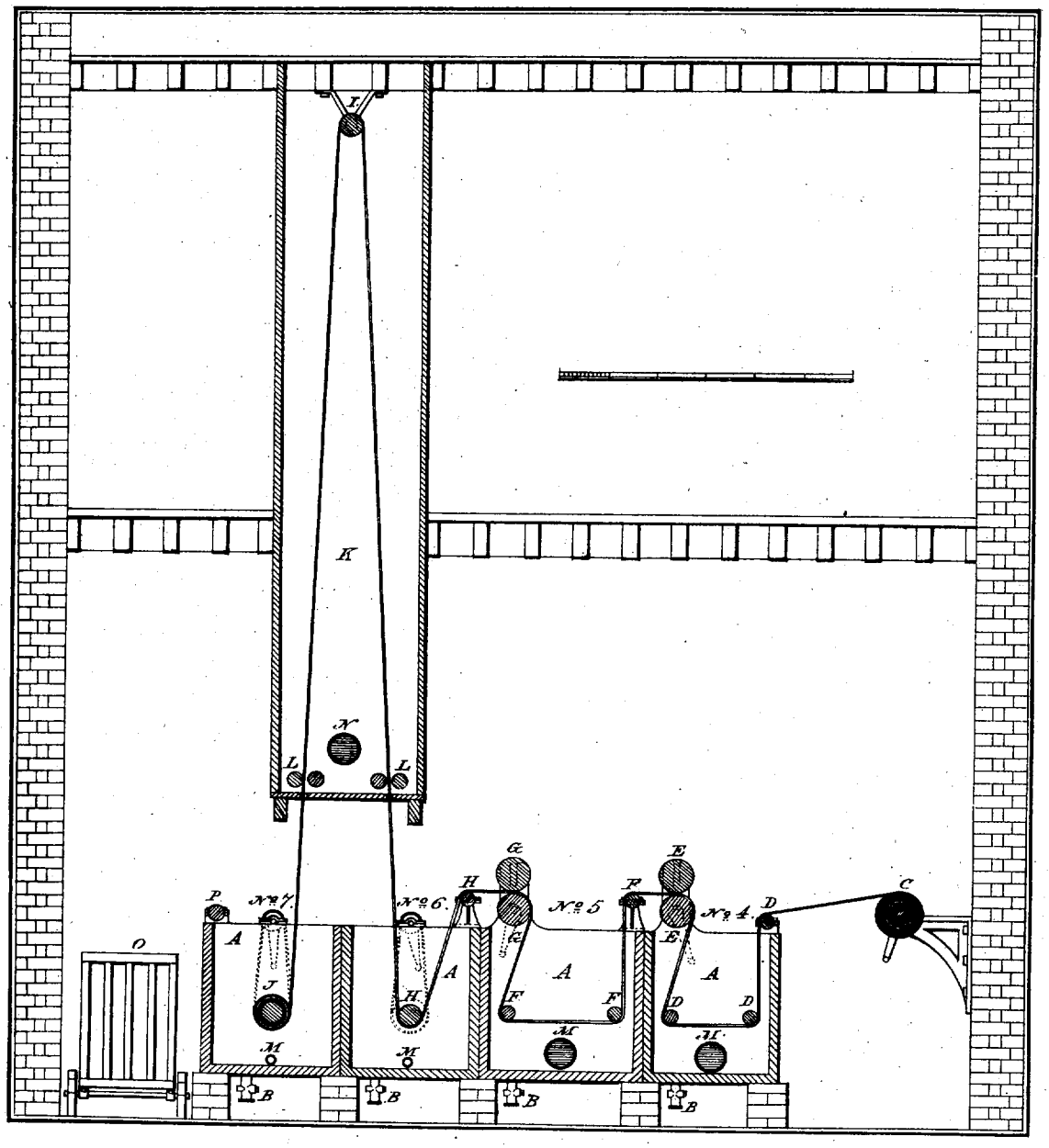

Felix Fossard Philadelphia

Letters Patent

The Schedule referred to in these Letters Patent and making part
of the same containing a description in the words of the said Felix Fossard
himself of his improvement in the processes of dying and in manufac
turing the Prussiates of Potash and Soda To all whom it may concern. Be it known that I Felix Fos
sard of the City of Philadelphia in the State of Pennsylvania have inven
ted or discovered certain improvements in the mode of manufacturing
the Prussiate of Potash and Soda and of dyeing therewith and with
certain other materials herein named the processes described and claim
ed being improvements on those specifically described by me in the
two several patents heretofore granted to me by the government of the
United States to wit, one on the fourteenth day of December 1832
and one on the 23d day of April 1834. and I do hereby declare
that although there are certain processes and machinery herein af
ter described which have been used and known before I do not intend
to claim these as my invention in the patent which I am hereby
soliciting but have introduced them with a view to render the process
that I do claim perfectly plain and intelligible to those skilled in the
art to which they appertain. Referring therefore not only to the
descriptions herein given but also to the exemplifications contained
in my former patents for a full understanding of the subject I limit
the claims now made to the following items. I claim the improved
process of dyeing blue by the double decomposition of a soluble ferrocyanate
or prussiate and a salt of iron or other metal by the means hereafter des
cribed — Process of Dyeing in Blue Acid Bath. No. 1.
This Bath is prepared with 100 parts of water in weight to one part
of sulphuric or other suitable acid and is to be employed at 80 to 100
degrees Fahrenheit. It should always [illegible] of an acid taste

9227X after the woolen material has passed through it. Washing bath No
2. consists of water to be used either at the ordinary temperature or
warmer and its use is only recommended for economy's sake to wash off
the excess of acid which may remain on the woolen material on being with
drawn from Bath No 1. — Alkaline Bath No 3. prepared with water
and a small quantity of alkali but in preference to others with the carbo
nate of Soda viz one part and a quarter of alkali in weight to 100 parts
of water heated to 75 or 80 degrees Faht.
Prussiate Bath No 4. Is prepared with the ferruginous prussiate of
Potash (any other ferruginous prussiate will answer the same purpose) and
should be 3 degrees strenght Beaumes areometer for salts and be employ
ed at about 90 to 100 degrees Faht. as this Bath should always be
kept in an acid state in preference to an alkaline one, one pound of sul
furic acid may be added to say 300 gallons of water. Ferruginous
bath No 5. To be formed with a protosalt of iron and water (any
other salt of iron. Molybdene &c. may be used with more or less success)
and to mark about 11 degrees of Beaumes areometer and should be em
ployed at about 160 or 70 Faht. This Bath may be acidulated like No
4 or be used in its neutral state — Bath No 6. Composed of
water heated to about 100 or 110 degrees Fht to which should be ad
ded to small quantity of acid say as in No 4.
Bath No 7. Composed of water heated to about 100 degrees Fht to which
should be added 1/2 part acid in weight to 100 parts of water. The liquid
which drains from the material acted upon on being withdrawn from
this Bath should always be of an acid taste
Stove Bath No 8. Is employed without immersing the dyed matter
in a liquid. It is simply a Stove made close and heated to about 110
degrees Fht in which the dyed material is to be placed and this place
should be covered with a woollen cloth at the top in order that the humidity
may pass off — Ammoniacal bath No 9. Is composed and em
ployed as follows. A close place being prepared as for No 8. the dyed stuff
is to be hung up and some highly concentrated liquid Ammonia is
to be placed in a vessel on the ground. Ammoniacal gas rising also [illegible]

92277X troduced in any other convenient way. The vapour arising from the ammonia will have an instantaneous effect and produce a darker colour. The liquid ammonia may also be used in another form namely put as much of it in water as may be necessary to produce the desired colour and pass the material regularly through it. Practice alone can dictate the quantity and the quality of the ammonia both as that of the water employed may differ. This bath is to be used at the ordinary temperature or heated to 60 or 70 degrees Fht.

Bath No 1 will be useful for about 20 operations. No 2 for 5. No 3. for 10. No 4 for 100 No 5 for 50 No. 6. for 4 — No 7 for 7 — No 9 for as long as any of the ammoniacal gas remains. The Baths No 1. 2. 3. 4. 5. 7 & 9. require being kept in the order indicated by adding from time to time the various things with which they are formed. when the baths No 4 and 5 are no longer fit for use they may be mixed together in equal volume and Prussian Blue be made with the deposit. The vessels containing the Baths intended for dyeing in the piece should be an oblong square form and those for dyeing wool of a round form furnished with a strainer worked by means of a crane and with a frame to rest the strainer on the heat while the wool is draining. Skeins are worked in the ordinary way. The Baths No 4 & 5 should be heated by steam in contact and not condensed — For woolens in the piece the cloth or stuff being freed from grease and fulled when the last operation is necessary it should be passed through the baths No 1. 2. and 3. in any ordinary sort of vessels and by the means ordinarily employed by dyers. after the Bath No 3. the cloth &c should be [illegible] and cleaned with fullers earth and be well washed in plenty of cold water. The cloth being well drained (or dryed in preference) pass it slowly through Baths No 4 5. 6 and 7. by means of the apparatus represented in the plate accompanying these specifications and described below. The stuff should be passed 4 or 5 times alternately from Bath No 6 or to Bath No 7. and vice versa for the purpose of raising the colour or fixing the oxide of iron: after this if the intensity of colour desired is not obtained it must be repassed through the Baths 4 5. 6 & 7. as recommended until the desired colour is obtained

9227X after which the cloth should be stocked and cleaned with fullers earth fuller's earth and be washed with cold water, Then dry the cloth on tenter hooks and place it on tenterhooks in the Stove Bath No 8. for about 3 hours and if desired let it afterwards be submitted to the action of ammonia in the bath No 9 or be passed through a liquid ammonia bath. The application of ammonia is only resorted to in certain cases when particular colours are wanted. but more so where a species of Redness is desired.
The operation may be shortened by scouring the wool by means of the Baths No 1. and 3. washing it and working it into cloth. This cloth having been wound upon a roller in the finishing room is carried to the dye House and passed through the baths 4. 5. 6 and 7. then it is to be stocked and cleaned with a mixture of fullers earth and of white soap water cold and concentrated as experience will dictate it will be necessary to take care that the soap employed is not too caustick and that it is perfectly dissolved before it is applied and that the cloth (if it has been dryed after the dyeing) is rendered a little humid before the soap is added. If however it should happen that the soap renders the colour less brilliant let the cloth be submitted to the action or contact of steam and it will become quite fresh again then dry and finish the cloth — When light Blues are wanted Baths No 4 & 5 should be made weaker or the Bath No. 9 as well as its substitute the white soap water should be dispensed with. Discription of the apparatus. A vessels in which the Baths are formed. B cocks to draw off the contents of the Baths C Roller on which the cloth is wound before entering the baths. D rollers over and under which the cloth passes in Bath No 4. E Pressing Rollers for equalizing and pressing the liquid out of the cloth. these rollers should be covered with coarse cloth &c. F Rollers. G pressing Rollers same as E. — H Rollers the first one to guide the cloth into the bath and the other one to pass it regularly through the liquid in the cloth may be wound on this last one previously to ascending into the air. I Roller J roller on which the cloth may be wound or it may be descended into the bath at liberty K [illegible] which should be heated by [illegible] or other wise

[illegible]

to the same temperature as the Baths No 6 & 7. This is not absolutely neces-
sary but it is recommended. L guiding Roller. M Tubes introduced into
the baths for heating them by steam. N Tube for heating enclosure Ho-
O carriage to receive the cloth after it is dyed. P Guiding Rollers to
conduct the cloth into the carriage O. The system of Rollers represented
in the Plate are recommended, and particularly the pressing cylinders or Rollers which
should be made very true and flexible but they are not absolutely neces-
sary. Any other means may be resorted to by which the distribution of
the liquid on and through the tissue in an even and regular way shall
be obtained. I would also have it understood that I lay no claim to
any part of the apparatus above described. The operation for wool is
as follows take wool which has been well cleaned by the ordinary
process, put it into Bath No 1 for about 10 minutes then raise it out
of the liquid let it drain for 10 minutes. lower it again and let it re-
main 10 minutes then raise it and allow it to drain for 10 or 15 minutes
and pass it into bath No 2 and 3 observing the same rule and fol-
lowing the same plan for each of these baths as for No 1. Then have the
wool washed in the usual way. when it is well drained (or dryed would
be preferable) place it again into a strainer and convey it to bath No
4 where it should be treated in the manner as in bath No 1. and after
the last immersion it should be allowed to drain for 10 minutes sus-
pended to the crane. then it should be lowered on a frame, placed across
the bath. and a false cover pierced with holes should be placed on.
Turn then the strainer and wool upside down and allow them to remain
in that position for 10 minutes This operation being intended to distrib-
ute the liquor as equally as possible over every part of the wool. Then turn
the strainer into its original position and pass it promptly to bath
No 5. where it should occasionally be raised and lowered for about
1/4 of an Hour. then raise it just clear of the bath and allow it
to drain for about 20 minutes then pass it into bath No. 6. where
the immersions should be made similar to those in regard to bath
No 1. after which pass it into bath No 7. where two immersions at in-
tervals of 15 minutes will be sufficient. wash in plenty of cold water

9227X dry by the ordinary way and then place the wool into the stove Bath
No 8. for about 3/4 of an hour. This will complete the operation of
dyeing and the wool may be treated as though dyed by any other pro
cess. The observations relating to the dyeing in the piece inserted above
apply also to the dyeing also in the wool. another method for
dyeing wool for Broadcloths by this new process is to pass it into bath
No 1 and then to scour it in the ordinary way and wash in plenty
of water. when drained pass it into a bath of carbonate of Soda. marking
about 2 degrees of the areometer of Beaumes for salts and 120 degrees
Fht for about 10 minutes when drained carry it to bath 5. for about
20 minutes wash immediately in plenty of water or rather lower
the strainer when the wool will have been draining for but a few min
utes into a vat full of lukewarm water so that the liquid draining
from the wool be not allowed to become acid again by absorption of
oxigen for in that state it combines anew with the iron and carries
it off from the wool, Then dry the advantage of this method is that
at the stage of the process the material may be dyed in any colours
(and especially in black) by means of dye woods without addition of metal
lic salts to the baths and with a great saving of dye stuffs. For Blues the
yellow wool is worked into cloth fulled dressed &c. then the piece is passed
into baths No 4. 6 and 7 by means of the apparatus described above. If the
lists headings &c are of a dye solid to acids they will be faithfully preserved
and the cloth will bear the appearance of having been dyed altogether in
the wool. carry to the stocks for cleansing &c. There are several other mod
ifications of this process which will occur to the dyer and be useful to him in
various cases. Cloths stuffs &c dyed in prussiate of iron blue may be dyed
in fancy colours by the ordinary process and dye stuffs as when dyed in in
digo blue for skeins it is necessary in order to obtain evenness and uniformity
of colour to distribute the liquid equally after bath No 4. & 5 by squeezing them
with sticks. and if suspended by changing their position that is to say by turning
the upper part down and vice versa as long as thought proper. any other sort
of tissue cloths or skeins than woolen ones do not require baths No 1. 2 3.
only silks require to be freed from the gum they contain by any of the ordinary

92277X process. The object of this improved process for which a Patent has been granted to me by the government of the United States on the 23d of April 1834 is to enable the manufacturer to produce a much finer prussiate of Potash than those Generally found in the market and therefore more available in the dyeing [illegible] ~~of~~ business and also to produce it in much larger quantities at a time with comparatively much less expense and trouble to himself and inconvenience to the neighbourhood Witness
Rich. Davis
Elisha P. Cooke F. Frossard.

(Drawing)

Exd.
[illegible]

(2800 Words)